(12) United States Patent
Biman et al.

(10) Patent No.: US 6,791,977 B1
(45) Date of Patent: Sep. 14, 2004

(54) RECLOCKER CIRCUIT AND ROUTER CELL

(75) Inventors: Aapoolcoyuz Biman, Hamilton (CA); Atul Krishna Gupta, Burlington (CA)

(73) Assignee: Gennum Corporation (CA)

(*) Notice: Subject to any disclaimer, the term of this patent is extended or adjusted under 35 U.S.C. 154(b) by 769 days.

(21) Appl. No.: 09/690,771

(22) Filed: Oct. 17, 2000

(51) Int. Cl.[7] .......................... H04L 12/50; H04Q 11/00
(52) U.S. Cl. ...................... 370/357; 370/419; 370/359; 327/407; 327/365; 379/290
(58) Field of Search ................................ 370/357, 380, 370/376, 535, 112, 352, 359, 388, 396, 360, 362, 363, 364, 365, 395, 419; 379/290; 348/461, 462, 463, 464, 465, 466, 467; 375/240.25, 240.26, 240.27, 240.28, 240.29; 327/407; 340/2.1, 2.2, 2.23, 2.28, 825.5, 172.5, 825.03

(56) References Cited

U.S. PATENT DOCUMENTS

| | | | |
|---|---|---|---|
| 4,359,718 A | * | 11/1982 | Payen .......................... 340/2.1 |
| 4,642,805 A | * | 2/1987 | Dumas et al. ............... 370/359 |
| 4,780,629 A | | 10/1988 | Unger et al. |
| 4,820,992 A | | 4/1989 | Avis |
| 5,257,260 A | | 10/1993 | Breidenstein et al. |
| 5,383,183 A | | 1/1995 | Yoshida |
| 5,388,099 A | | 2/1995 | Poole |
| 5,392,279 A | | 2/1995 | Taniguchi |
| 5,414,706 A | | 5/1995 | Muhr |
| 5,493,565 A | * | 2/1996 | Hanson et al. ............... 370/359 |
| 5,555,243 A | | 9/1996 | Kakuma et al. |
| 5,577,042 A | * | 11/1996 | McGraw et al. ............. 370/257 |
| 5,604,617 A | | 2/1997 | Burton |
| 5,734,649 A | | 3/1998 | Carvey et al. |
| 5,751,764 A | | 5/1998 | Meyer et al. |
| 5,798,580 A | | 8/1998 | Morozov et al. |
| 5,923,868 A | | 7/1999 | Nazarian et al. |
| 5,982,770 A | | 11/1999 | Sekine |
| 5,999,528 A | | 12/1999 | Chow et al. |
| 6,104,732 A | * | 8/2000 | Pearman ...................... 370/541 |
| 6,674,747 B1 | * | 1/2004 | Lassaux et al. ............. 370/352 |

FOREIGN PATENT DOCUMENTS

| | | |
|---|---|---|
| EP | 0430 405 | 6/1991 |
| WO | WO 98/21857 | 5/1998 |

OTHER PUBLICATIONS

Boettle, Dietrich and Kreutzer, Heinrich, "Technology Aspects for System 12 Broadband ISDN", IEEE Journal on Selected Areas in Communications, (1987) Oct. No. 8, NY, NY.

Clos, Charles, "A Study of Non-Blocking Switching Networks", Bell System Technical Journal, Mar. 1953, pp. 406–424.

* cited by examiner

Primary Examiner—Wellington Chin
Assistant Examiner—Jamal A. Fox
(74) Attorney, Agent, or Firm—Jones Day

(57) ABSTRACT

An improved reclocker circuit and router cell are provided that are particularly useful when configured into a router matrix comprising a plurality of interconnected router cells. The improved reclocker circuit includes an integral N-to-1 multiplexer (MUX), wherein N is at least three. The improved router cell includes the reclocker/MUX circuit, a switch, and a fan-out circuit. A plurality of ports are coupled to the router cell circuitry, including an input port, an output port, a plurality of expansion input ports, and a plurality of expansion output ports. The improved router cell couples either the input port or one the expansion input ports to its output port, and it also couples the input port to each of the expansion output ports. By using the improved router cells in the design of a router matrix, jitter induced by the reclocker circuits is minimized.

16 Claims, 5 Drawing Sheets

RECLOCKER CIRCUIT AND ROUTER CELL

BACKGROUND

1. Technical Field

This patent application is directed to the field of signal switching and routing. More specifically, the application describes an improved reclocker circuit and router cell that are particularly useful in switching and routing video, telecommunication, or other types of time-sensitive signals in a large router matrix comprising a plurality of interconnected router cells.

2. Description of the Related Art

The core building block of the modern television studio is the video router. The video router is a switch matrix that is coupled to and routes signals between numerous video sources and numerous processing devices within the studio. Because timing is an important aspect of routing and processing video signals (as well as other types of signals), video routers typically employ reclocking circuitry in order to correct the timing of the numerous signals that are routed through the matrix. Typical video routers in use today may have 40 or more inputs and outputs and are typically configured as a matrix of interconnected router cells.

When signals pass through a router, or through any other type of communication circuitry, the signals typically experience timing jitter. This timing jitter is manifested as a variation in the period of a signal waveform that typically cannot be removed by amplification and clipping, even if the signal is binary. As a result, systems for switching and/or processing time-sensitive signals typically employ a phase-locked loop (PLL) to extract a jitter-free version of a clock signal, which is then used to synchronize the signal being routed or processed. This extraction and synchronization process is generally referred to in this field as "retiming" or "reclocking," and devices that perform this process are typically referred to as "retimers" or "reclockers." Another commonly-used term for this device is a "data regenerator." A typical retiming (reclocking) circuit is the Gennum GS9035, available from Gennum Corp. of Burlington, Ontario.

Typical reclocker circuits, however, cannot perfectly correct the timing of the input signal, and thus there is still some small amount of jitter that remains in the signal. This remaining jitter creates a problem for video routers having a large number of router cells (and hence a large number of sequential reclocker circuits), because the small amount of jitter that remains in the signal being routed is additive from router cell to router cell. Eventually this additional jitter builds up to a point at which the data content of the signal has been degraded so as to become unusable.

FIG. 1 is a block diagram of a known router cell 10. This router cell 10 includes an input (A) 18, an output (Y) 20, an equalizer 12, a switch 14, and a reclocker circuit 16. The input signal (A) 18 is typically coupled to the equalizer 12 prior to being switched, in order to compensate for studio cable or other lossy medium over which the signal is transmitted. The output of the equalizer 12 is then coupled to the input of the switch 14. The switch 14 either connects or disconnects the input signal (A) 18 to the output (Y) 20. Prior to outputting the signal (Y), however, the signal is processed by a reclocker circuit 16. The reclocker circuit 16 retimes the data in the input signal (A) 18 before transmitting it to subsequent router cells, or outside of the router matrix to some device in the studio. This retiming function is necessary in practical signal switching systems in order to ensure the timing integrity of the data within the signals being switched through the router. The router cell 10 shown in FIG. 1 is considered non-expandable, as the maximum number of inputs is limited to one (A) 18.

FIG. 2 is a block diagram of a known router cell 10 with a single expansion input/output pair router (Xi, Xo) 22, 24. The router cell 10 shown in FIG. 2 includes many of the same elements as the cell shown in FIG. 1. In FIG. 2, however, an expansion input/output pair (Xi, Xo) 22, 24, a 2-to-1 (2:1) multiplexer 26, and a second reclocker circuit 16 have been added to the router cell. These additional elements enable the router cell 10 to be expandable so as to form a matrix of router cells, as further shown below with reference to FIG. 4.

In this router cell 10, the expansion input (Xi) 22 and the output of the switch 14 are routed to a 2:1 multiplexer 26. The 2:1 multiplexer 26 selects one of the inputs (Xi) 22 or (A) 18 for routing to the first reclocker circuit 16 and then onto the router cell output (Y) 20. The input signal (A) 18 is routed through the switch 14 and is then coupled to the second reclocker circuit 16 before being output on the expansion output line (Xo) 24. FIG. 3 is a simplified schematic of the router cell shown in FIG. 2.

FIG. 4 is a schematic of a known router matrix comprising a plurality of router cells. Using the router cell 10 shown in FIG. 2 as a basic building block, a router matrix can be created by connecting one router cell to one or more other cells. For example, as shown in FIG. 4, a four input, four output router matrix can be constructed using 16 router cells 10. The router cells 10 are organized into a two-dimensional matrix structure comprising a plurality of rows and columns. The signal inputs A0, A1, A2 and A3 (18) are coupled to the first row of router cells 10 located at the top of the router matrix. The expansion inputs Xi0, Xi1, Xi2, and Xi3 (22) are coupled to the first column of router cells 10 located on the left side of the matrix. The signal outputs Y0, Y1, Y2 and Y3 (20) are coupled to the last column of router cells 10 located on the right side of the matrix. And the expansion outputs Xo1, Xo2, Xo3, and Xo4 (24) are coupled to the last row of router cells 10 located at the bottom of the router matrix. The remaining cells in the matrix are then configured as shown in FIG. 4 in order to connect the inputs 18, 22 to the outputs 20, 24.

In the router shown in FIG. 4, connecting signal input A0 to output Y3 produces a path that reclocks the input data signal seven times. To get from A0 to Y3, the signal at A0 is routed through router cells 10A, 10B, 10C, 10D, 10E, 10F, and 10G (i.e., seven router cells). It can be seen from this architecture that the longest path through an N×N router designed in this manner results in the input signal being reclocked 2N−1 times. Thus, for the 4×4 matrix shown in FIG. 4, the number of reclocks is 2(4)−1 or 7.

The disadvantage with this router design is that the number of reclocks in the longest path expands linearly with the size of the router. With jitter accumulating from each reclocker circuit, every subsequent stage in the matrix will encounter more difficulty in retiming the data. Eventually, the additive jitter induced in the data signal will be such that the reclocker circuit 16 cannot retime the signal being routed through the matrix, at which point the signal is relatively useless.

SUMMARY

An improved reclocker circuit and router cell are provided that are particularly useful when configured into a router matrix comprising a plurality of interconnected router cells.

The improved reclocker circuit includes an integral N-to-1 multiplexer (MUX), wherein N is at least three. The improved router cell includes the reclocker/MUX circuit, a switch, and a fan-out circuit. A plurality of ports are coupled to the router cell circuitry, including an input port, an output port, a plurality of expansion input ports, and a plurality of expansion output ports. The improved router cell couples either the input port or one the expansion input ports to its output port, and it also couples the input port to each of the expansion output ports. By using the improved router cells in the design of a router matrix, jitter induced by the reclocker circuits is minimized.

According to one aspect of the invention, a router matrix is provided for routing signals from a plurality of input ports to a plurality of output ports. The router matrix includes a plurality of interconnected router cells coupled between the input ports and the output ports, wherein the interconnected router cells are configured into a two-dimensional matrix. Each of the router cells includes an input port, an output port, a plurality of expansion input ports, and a plurality of expansion output ports. The router cells are interconnected using the input ports, the output ports, the plurality of expansion input ports, and the plurality of expansion output ports in order to reduce the maximum path length through the router matrix, and thereby reduce the number of reclocks of the routed signals.

According to another aspect of the invention, an improved reclocking circuit is provided that includes an N:1 multiplexer for receiving N input signals and for selecting one of the N input signals, wherein N is at least 3; and a reclocker coupled to the output of the N:1 multiplexer for retiming the data in the selected input signal.

Still another aspect of the invention provides a router cell for use in a router matrix. The router cell includes: (i) a switch coupled between an input port and an output port of the router cell, wherein the switch includes an input for receiving an input signal and two outputs, a first switched output and a second pass-through output; (ii) a first reclocker circuit coupled to the pass-through output of the switch; (iii) a fan-out circuit coupled to the first reclocker for duplicating a signal output from the first reclocker circuit in order to generate a plurality of expansion output signals; and (iv) a second reclocker circuit having an integral N:1 multiplexer, where N is at least 3, and wherein the second reclocker circuit is coupled to a plurality of expansion input ports of the router cell and the switched output from the switch and generates an output signal.

It should be noted that these are just some of the many aspects of the present invention. Other aspects not specified will become apparent upon reading the detailed description of the preferred embodiment set forth below.

DETAILED DESCRIPTION OF THE DRAWING

Figure 5:
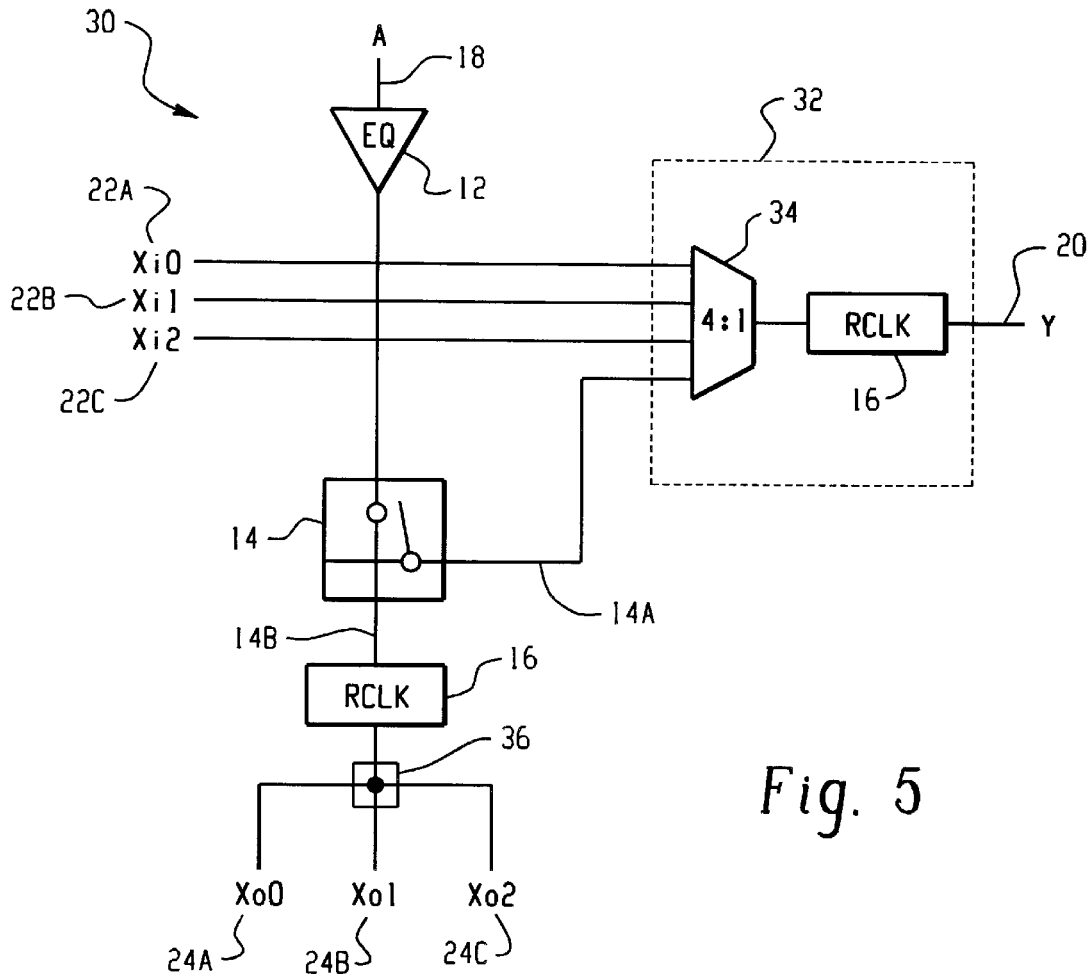
FIG. 5 is a block diagram of an improved router cell having a plurality of expansion input/output pairs.

Turning now to the remaining drawings, FIG. 5 is a block diagram of an improved router cell 30 having a plurality of expansion input/output pairs 22A–22C, 24A–24C, and including an improved reclocker circuit 32. This improved router cell 30 is particular useful in combination with other router cells 30 of the same type in forming a router matrix, such as the type set forth below in FIGS. 7 and 8. This type of router matrix is particularly useful, for example, as a video router for connecting video signals in a television studio. These video signals could be digital signals, such as SDTV or HDTV television signals, or they could be other types of digital video signals. The present invention, however, is not limited to routing video signals, and can be used to switch and route and type of digital signals in which it is desirable to reduce the additive jitter caused by a reclocking (or retiming) circuit operating within the switching mechanism.

The improved router cell 30 shown in FIG. 5 may include an input signal port 18 (for receiving an input signal A), an output signal port 20 (for outputting a signal Y), a plurality of expansion input ports 22A, 22B, 22C (for receiving a plurality of expansion inputs Xi0, Xi1, Xi2), and a plurality of expansion output ports 24A, 24B, 24C (for outputting a plurality of expansion output signals Xo0, Xo1, Xo2). Coupled between the ports 18, 20, 22, 24 are an equalizer 12, a switch 14, a first reclocker circuit 16 of a first type, a second reclocker circuit 32 of a second type, and a fan-out circuit 36.

The first reclocker 16 is similar to known reclockers, such as the Gennum GS9035. The second reclocker 32, however, is an improved reclocker circuit that includes a known reclocker component 16, Such as the Gennum GS 9035, and also includes an N-to-1 expansion multiplexer 34, where N is at least 3 (i.e., the expansion multiplexer is at least 3:1). Preferably, the first reclocker circuit 16 and the expansion multiplexer 34 are integrated into a single device, such as an integrated circuit, although alternatively they may be separate components.

Figure 1:
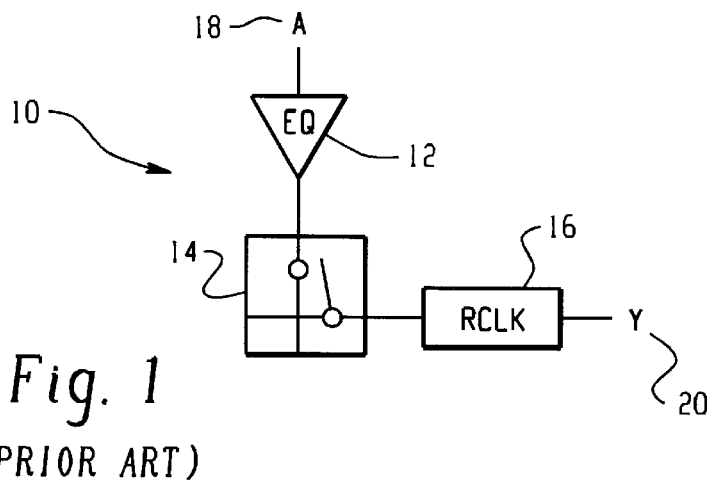
FIG. 1 is a block diagram of a known router cell.

The improved router cell shown in FIG. 5 operates as follows. The input signal A is coupled to the input signal port 18 and is passed through the equalizer 12, which operates in a manner similar to the equalizer 12 shown in FIGS. 1 and 2. The input signal A passes through the equalizer 12 and is then coupled to the switch 14. The switch 14 has one input, which is coupled to the output of the equalizer 12, and two outputs 14A, 14B. The first output 14A is a switched output, which is coupled to one of the inputs of the N:1 MUX 34 of the improved reclocker circuit 32. The switched output 14A is either coupled to the input signal A, which is present at the input to the switch, or it is coupled to no signal at all, depending on the state of the switch 14. The second output 14B is a pass-through output that simply passes through the input signal A.

The passed through signal on the second output 14B is coupled to a standard reclocker circuit 16, which performs the reclocker (or retiming) operation on the input signal A. The reclocked signal is then output from the reclocker 16 to a fan-out circuit 36. The fan-out circuit 36 couples the reclocked signal from the reclocker 16 to the plurality of expansion output ports 24A, 24B, 24C, thereby providing a plurality of expansion output signals Xo0, Xo1, Xo2.

In addition to the switched output 14A, the improved reclocker circuit 32 is also coupled to the plurality of expansion input ports 22A, 22B, 22C to thereby receive the plurality of expansion input signals Xi0, Xi1, Xi2. The signals on these lines (ports) 14A, 22A, 22B, 22C are coupled to the inputs of the N:1 expansion multiplexer 34, which, as noted previously, includes at least three inputs, and perhaps more. The expansion multiplexer 34 selects one of the inputs and routes the selected signal to the reclocker 16, which performs the same reclocker operation as the reclocker 16 connected to the second output 14B of the switch 14. The reclocked signal from the improved reclocker circuit 32 is provided on the output port 20 as output signal Y.

Figure 6:
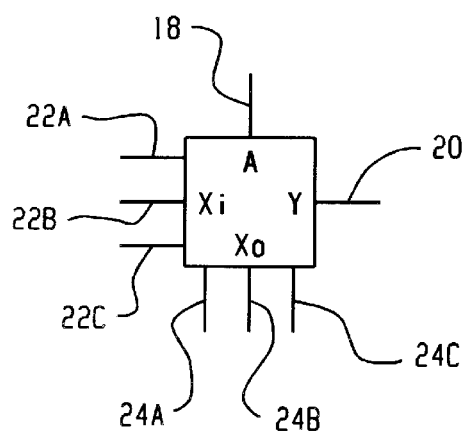
FIG. 6 is a simplified schematic of the improved router cell shown in FIG. 5.

FIG. 6 is a simplified schematic of the improved router cell 30 shown in FIG. 5. This schematic depicts the improved router cell 30 as a black box having an input port 18 for receiving an input signal A, an output port 20 for providing an output signal Y, a plurality of expansion input ports 22A, 22B, 22C for receiving a plurality of expansion input signals Xi, and a plurality of expansion output ports 24A, 24B, 24C for providing a plurality of expansion output signals Xo. The simplified schematic shown in FIG. 6 can be used to depict a router matrix (or router) comprising a plurality of interconnected router cells.

Figure 7:
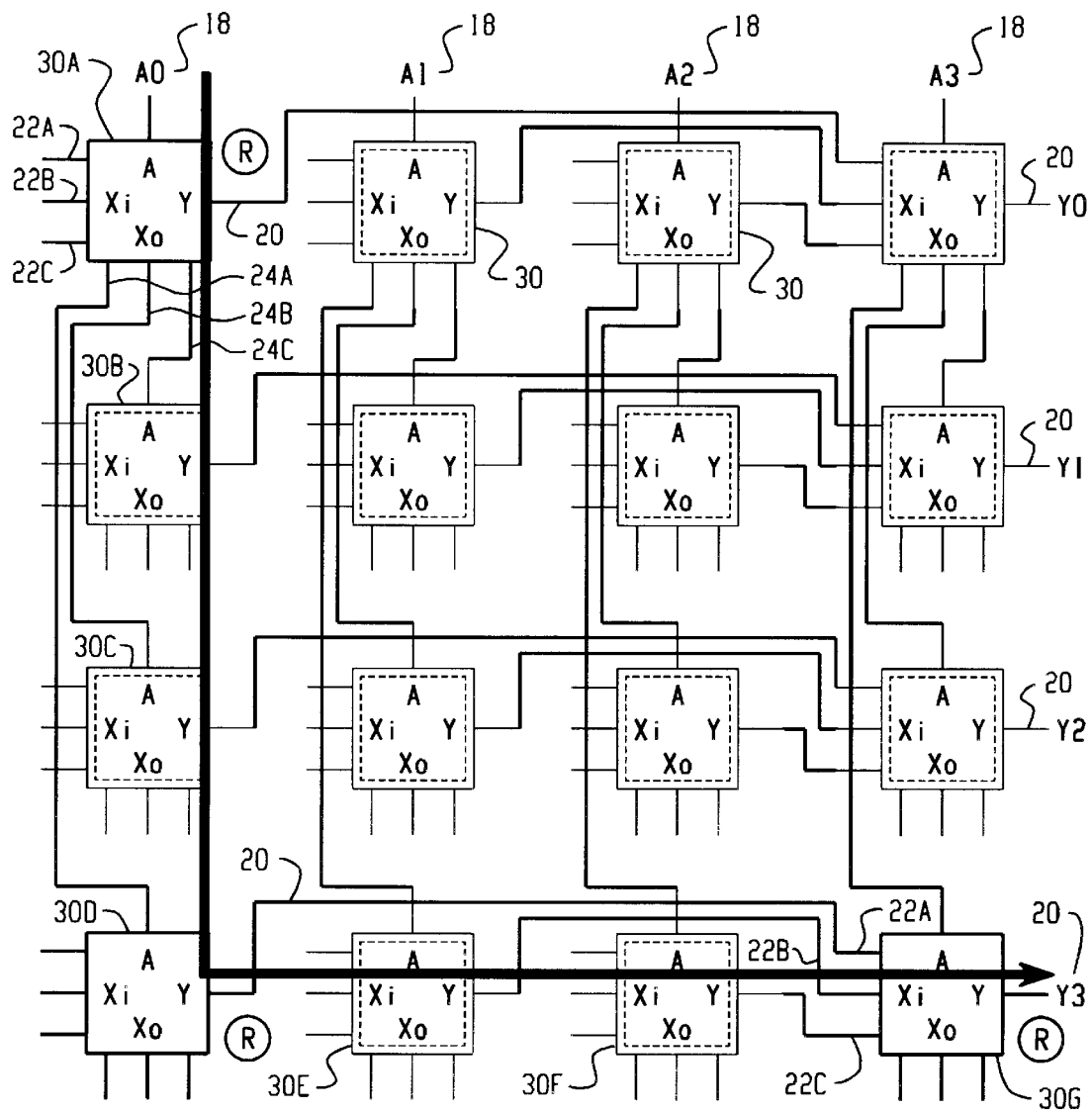
FIG. 7 is a schematic of an improved router matrix comprising a plurality of the improved router cells shown in FIG. 5, and demonstrating a first routing path through the router matrix.

FIG. 7 is a schematic of an improved router matrix comprising a plurality of the improved router cells shown in FIG. 5, and demonstrating a first routing path through the router matrix. The router matrix shown in FIG. 7 is a four input, four output router matrix comprising 16 router cells, similar to that shown in FIG. 4. In the router matrix of FIG. 7, however, the improved router cells 30 shown in FIGS. 5, 6 are utilized in order to create a more efficient router that minimizes jitter in the signals routed through the matrix.

In the router matrix shown in FIG. 7, each router cell 30 includes three expansion input ports 22A, 22B, 22C and three expansion output ports 24A, 24B, 24C, and therefore can be connected to a maximum of eight other router cells 30 via these expansion ports and the input and output ports 18, 20. Using this enhanced connectivity, the router matrix can be constructed in a manner that minimizes the number or router cells (and hence reclocking operations) along a particular path through the matrix.

Figure 4:
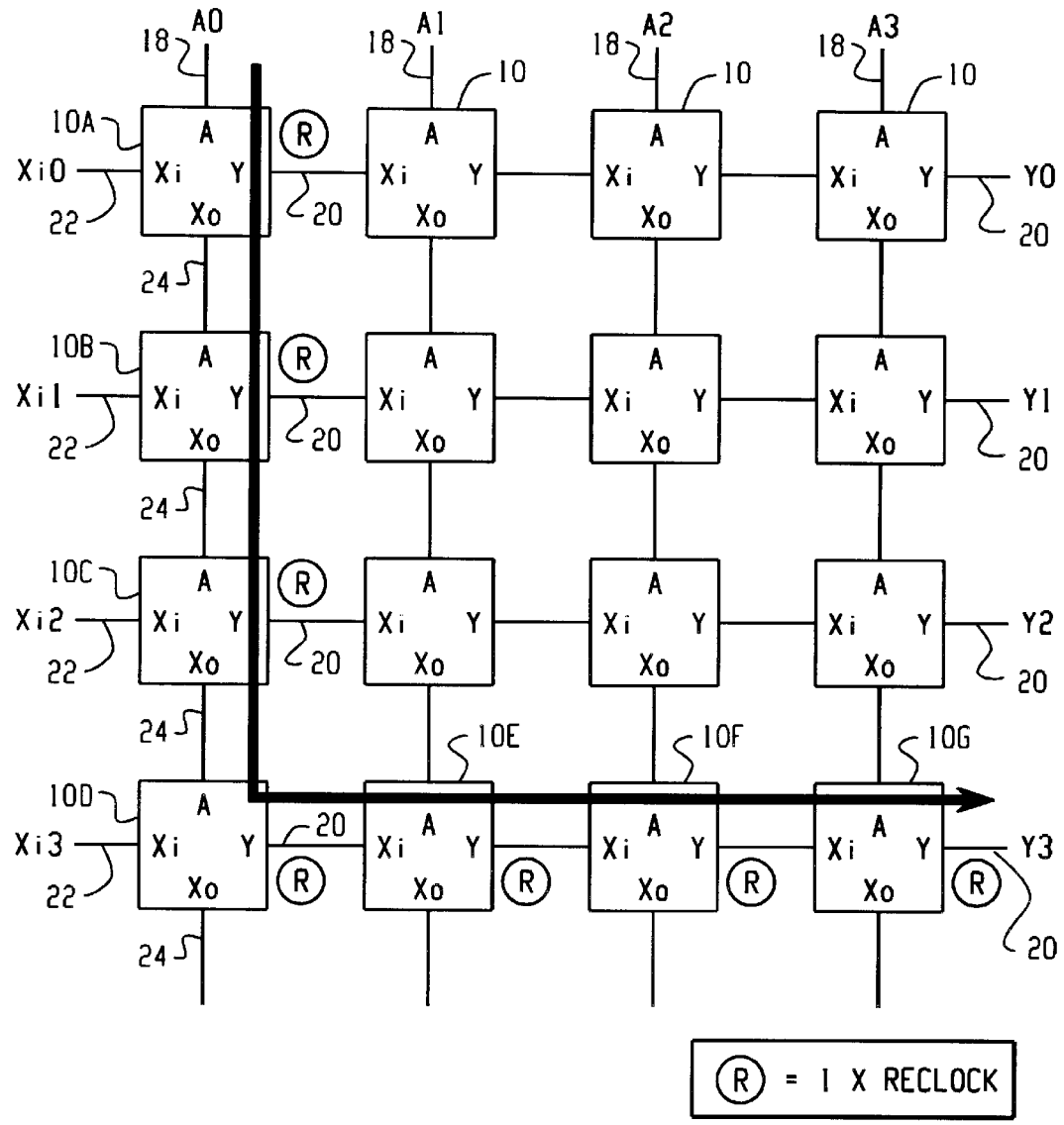
FIG. 4 is a schematic of a known router matrix comprising a plurality of the router cells shown in FIG. 2.

Consider, for example, the path shown in FIGS. 4 and 7. In FIG. 4, the path from input A0 to output Y3 passes through seven router cells 10A–10G, and therefore the signal is reclocked seven times. In the same path shown in FIG. 7, however, the input signal A0 passes through only three router cells 30A, 30D, 30G prior to reaching the output Y3. This reduced path length is accomplished by coupling router cell 30A to router cells 30B, 30C and 30D via the expansion output ports 24A, 24B, 24C of router cell 30A, and by coupling router cell 30G to the output of router cells 30D, 30E and 30F via the expansion input ports 22A, 22B, 22C of router cell 30G. By coupling the router cells 30A in this manner, the maximum number of reclocks between any input and any output is substantially reduced over known router designs.

The router matrix shown in FIG. 7 is a simple case of a four input, four output design. In this simple case, the number of times that the data signals are retimed is reduced from a maximum of seven (in the known router design) to a maximum of three. The efficiency gains of the present invention are even more pronounced for larger N matrices.

Figure 2:
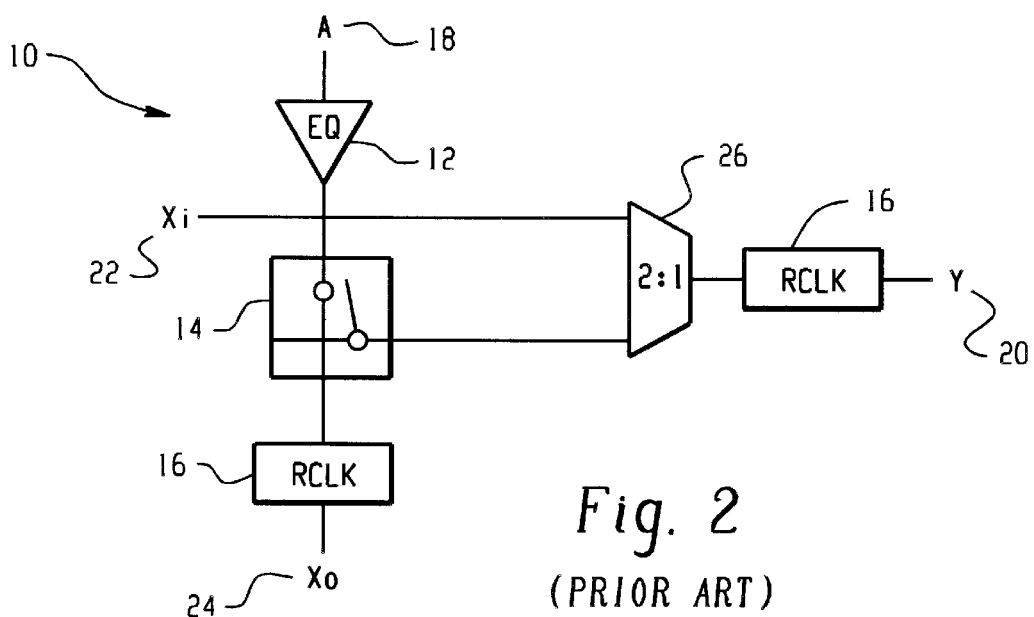
FIG. 2 is a block diagram of a known router cell with a single expansion input/output pair.
Figure 3:
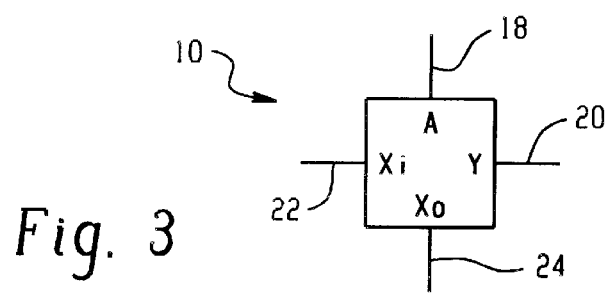
FIG. 3 is a simplified schematic of the known router cell shown in FIG. 2.

For example, in a 40×40 router (i.e., N=40), if the known router cell 10 and matrix shown in FIGS. 2 and 4 are utilized, then the maximum number of reclocks is 79 (i.e, 2N−1). If, however, the improved router cell shown in FIG. 5 is utilized to build the matrix, then the maximum number of reclocks along our path would be 7. If only two expansion inputs/outputs are provided per cell, instead of three (as shown in FIG. 5), then the maximum number of reclocks is increased from 7 to 11. In either case, the improved router cell of the present invention enables a dramatic decrease in the number of relocking operations along a given path.

Figure 8:
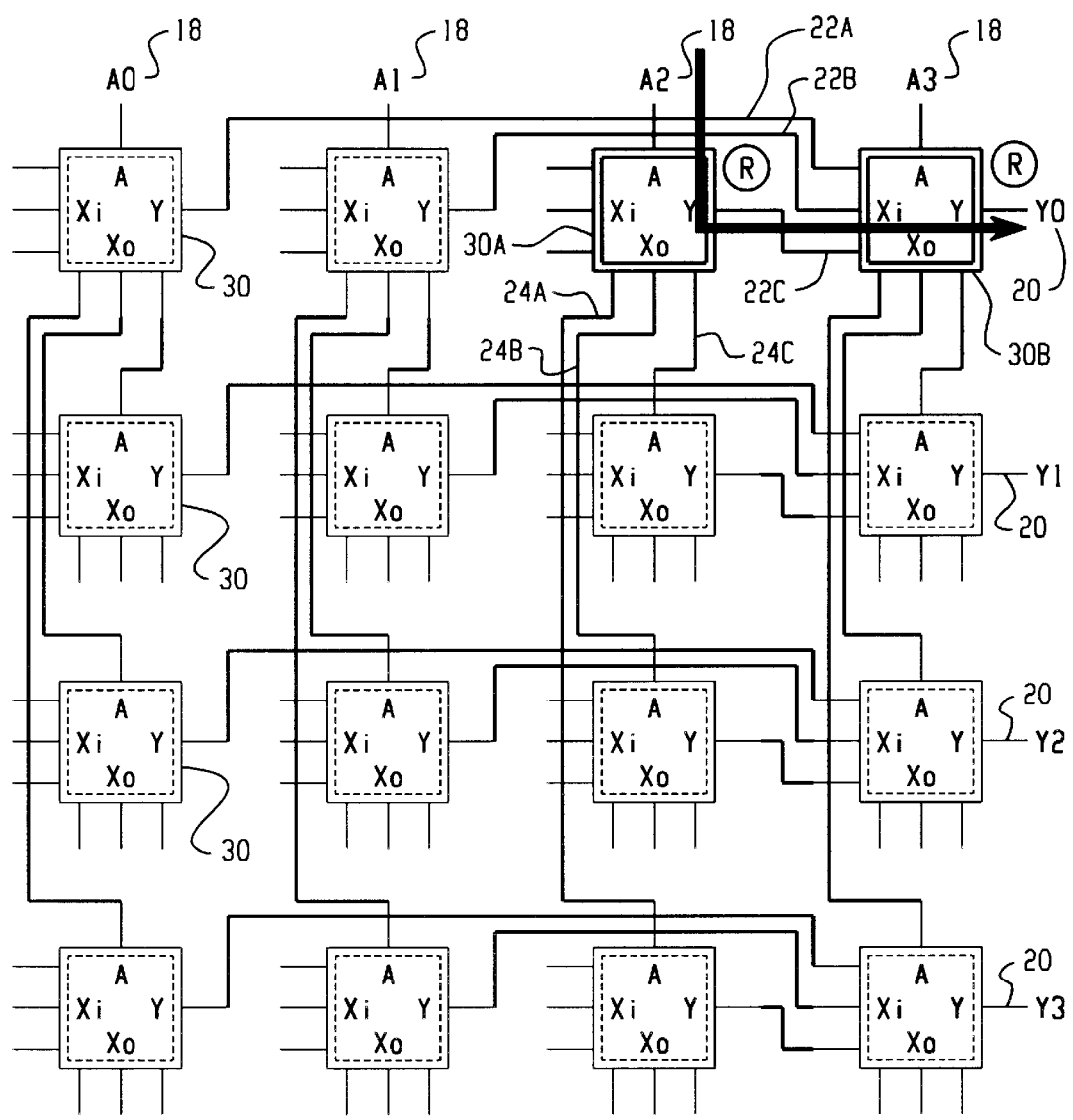
FIG. 8 is a schematic of the improved router matrix shown in FIG. 7 demonstrating a second routing path through the router matrix.

FIG. 8 is a schematic of the improved router matrix shown in FIG. 7 demonstrating a second routing path through the router matrix. In this path, the input signal A2 is routed to the output signal Y0 through the router cells 30A and 30B. Thus, two reclocks are encountered when traversing this path.

Having described an example of the invention by way of these drawing figures, it should be understood that this is just one example of the invention, and nothing set forth in this detailed description is meant to limit the invention to this example. Other embodiments, improvements, substitutions, alternatives, or equivalent elements and steps to those set forth in this application are also meant to be within the scope of the invention.

What is claimed is:

1. A router matrix for routing signals from a plurality of input ports to a plurality of output ports, comprising:

a plurality of interconnected router cells coupled between the input ports and the output ports, wherein the interconnected router cells are configured into a two-dimensional matrix;

each of the router cells having an input port, an output port, a plurality of expansion input ports, and a plurality of expansion output ports, and wherein the router cells are interconnected using the input ports, the output ports, the plurality of expansion input ports, and the plurality of expansion output ports in order to reduce the maximum path length through the router matrix.

2. The router matrix of claim 1, wherein at least one of the router cells is connected to at least six other router cells via the input port, the output port, the plurality of expansion input ports, and the plurality of expansion output ports.

3. The router matrix of claim 1, wherein signals being routed through the interconnected router cells are video signals.

4. The router matrix of claim 3, wherein the video signals are HDTV digital video signals.

5. The router matrix of clam 1, wherein each router cell includes:

a switch coupled between the input port and the output port, wherein the switch includes an input for receiving an input signal and two outputs, a first switched output and a second pass-through output;

a first reclocker circuit coupled to the pass-through output of the switch;

a fan-out circuit coupled to the first reclocker for duplicating a signal output from the first reclocker circuit in order to generate a plurality of expansion output signals; and a second reclocker circuit having an integral N:1 multiplexer, where N is at least 3, and wherein the second reclocker circuit is coupled to the plurality of expansion input ports and the switched output from the switch and generates an output signal.

6. The router matrix of claim 5, wherein each router cell further includes an equalizer coupled between the input port and the input of the switch.

7. The router matrix of claim 5, wherein N is at least 4.

8. The router matrix of claim 1, wherein each router cell includes a reclocker circuit.

9. The router matrix of claim 8, wherein each router cell includes an expansion multiplexer coupled to the plurality of expansion input ports and the input port for selecting a signal on one of the plurality of expansion input ports or the input port, and a fan-out circuit for duplicating a signal on the input port to the plurality of expansion output ports.

10. A reclocking circuit, comprising:
   an N:1 multiplexer for receiving N input signals and for selecting one of the N input signals, wherein N is at least 4; and
   a reclocker coupled to the output of the N:1 multiplexer for retiming the data in the selected input signal.

11. The reclocking circuit of claim 10, wherein N is greater than 4.

12. The reclocking circuit of claim 10, wherein the input signals are video signals.

13. The reclocking circuit of claim 12, wherein the video signals are HDTV digital video signals.

14. A router cell for use in a router matrix, comprising:
   a switch coupled between an input port and an output port of the router cell, wherein the switch includes an input for receiving an input signal and two outputs, a first switched output and a second pass-through output;
   a first reclocker circuit coupled to the pass-through output of the switch;
   a fan-out circuit coupled to the first reclocker for duplicating a signal output from the first reclocker circuit in order to generate a plurality of expansion output signals; and
   a second reclocker circuit having an integral N:1 multiplexer, where N is at least 3, and wherein the second reclocker circuit is coupled to a plurality of expansion input ports of the router cell and the switched output from the switch and generates an output signal.

15. The router cell of claim 14, further including an equalizer coupled between the input port and the input of the switch.

16. The router cell of claim 14, wherein N is at least 4.

* * * * *